United States Patent
Gustafsson et al.

(10) Patent No.: US 12,235,184 B2
(45) Date of Patent: Feb. 25, 2025

(54) ROTARY ENCODER AND A METHOD FOR MONITORING OPERATION OF THE ROTARY ENCODER

(71) Applicant: LEINE & LINDE AB, Strängnäs (SE)

(72) Inventors: Mats Gustafsson, Stallarholmen (SE); Martin Lundgren, Strängnäs (SE); Robin Johansson, Strängnäs (SE)

(73) Assignee: LEINE & LINDE AB, Strängnäs (SE)

( * ) Notice: Subject to any disclaimer, the term of this patent is extended or adjusted under 35 U.S.C. 154(b) by 288 days.

(21) Appl. No.: 18/100,774

(22) Filed: Jan. 24, 2023

(65) Prior Publication Data

US 2023/0243719 A1 Aug. 3, 2023

(30) Foreign Application Priority Data

Jan. 28, 2022 (EP) .................................. 22154049

(51) Int. Cl.
- *G01M 13/04* (2019.01)
- *G01B 21/22* (2006.01)
- *G01L 1/22* (2006.01)

(52) U.S. Cl.
CPC ............ *G01M 13/04* (2013.01); *G01B 21/22* (2013.01); *G01L 1/2262* (2013.01)

(58) Field of Classification Search
CPC ......... G01M 13/04; G01B 21/22; G01B 7/18; G01L 1/2262; G01D 5/24457; G01D 5/34738; G01D 5/24442; G01D 5/00; G01D 5/3473; G01D 18/001
See application file for complete search history.

(56) References Cited

U.S. PATENT DOCUMENTS

| | | | | |
|---|---|---|---|---|
| 6,841,993 | B2* | 1/2005 | Iwamoto | G01P 3/443 |
| | | | | 324/207.21 |
| 8,087,832 | B2* | 1/2012 | Blades | F16C 11/045 |
| | | | | 384/624 |
| 10,293,481 | B1* | 5/2019 | Rovekamp | B25J 13/088 |
| 11,519,764 | B2* | 12/2022 | Gustafsson | G01D 5/04 |
| 2004/0196027 | A1 | 10/2004 | Iwamoto | |
| 2009/0116777 | A1 | 5/2009 | Blades | |
| 2021/0270644 | A1 | 9/2021 | Gustafsson | |

FOREIGN PATENT DOCUMENTS

EP 2937165 A1 10/2015

OTHER PUBLICATIONS

European Search Report issued in corresponding EP Patent Application No. 22154049, dated Jun. 14, 2022, pp. 1-2.

\* cited by examiner

*Primary Examiner* — Freddie Kirkland, III
(74) *Attorney, Agent, or Firm* — Carter, DeLuca & Farrell LLP

(57) ABSTRACT

A rotary encoder includes a stator and a shaft having a bearing configuration arranged in a housing. The shaft is rotatable relative to the housing via the bearing arrangement, and a rotor is attached to the shaft. A strain sensor arrangement, attached to the housing, is adapted to determine a malfunction of the bearing configuration. The housing has a flexible structure that facilitates transmitting forces associated with the bearing configuration to the strain sensor arrangement. The strain sensor arrangement is adapted to detect tension and/or compression associated with the housing, and a malfunction of the bearing configuration is determined based on the detected tension and/or compression.

20 Claims, 5 Drawing Sheets

ROTARY ENCODER AND A METHOD FOR MONITORING OPERATION OF THE ROTARY ENCODER

CROSS-REFERENCE TO RELATED APPLICATIONS

The present application claims priority to Application No. 22154049.5, filed in the European Patent Office on Jan. 28, 2022, which is expressly incorporated herein in its entirety by reference thereto.

FIELD OF THE INVENTION

The present invention relates to a rotary encoder. According to example embodiments, the rotary encoder includes a rotor and a shaft having a bearing configuration. The present invention also relates to a method for determining a malfunction of the bearing configuration of the rotary encoder. The present invention further relates to a computer program product, including, for example, program code for a computer to implement the method described herein.

BACKGROUND INFORMATION

Rotary encoders are used in industry for position and speed monitoring and are typically mounted on a shaft of a motor or a gearbox of an assembly. Rotary encoders may be equipped with a rotor unit and a stator unit for detecting operational parameters of the shaft of the assembly.

Rotary encoders are assembled with different shafts and bearings. In the event that case bearings of the rotary encoder are blocked or become sluggish, a driving torque on the rotary encoder shaft is increased and may eventually lead to the breaking of a connection between the rotary encoder shaft and the shaft of the assembly.

SUMMARY

Example embodiments of the present invention provide a rotary encoder, which seeks to mitigate, alleviate, or eliminate one or more of the above-identified deficiencies and disadvantages, singly or in any combination.

Example embodiments of the present invention provide a method for determining a malfunction of a rotary encoder.

Example embodiments of the present invention provide a rotary encoder and a computer program adapted to determining a malfunction of a rotary encoder.

Example embodiments of the present invention provide method that allows for a more reliable and safe operation of a rotary encoder.

Example embodiments of the present invention provide a method and a computer program that achieve an automated and user-friendly monitoring of the operation of a bearing configuration of a rotary encoder.

Example embodiments of the present invention provide a method, a rotary encoder, and a computer program for determining a malfunction of a rotary encoder.

According to example embodiments, a rotary encoder includes a shaft having a bearing configuration. The bearing configuration is internally arranged in a housing and includes at least one bearing unit. The bearing configuration is configured to allow rotation of the shaft relative to the housing. The rotary encoder further includes a rotor attached to the shaft and a stator.

The rotary encoder includes a strain sensor arrangement configured to determine a malfunction of the bearing configuration. The strain sensor arrangement is attached to the housing, and the housing has a flexible structure so as to, in connection with rotation of the shaft, facilitate transmitting forces associated with the bearing configuration to the strain sensor arrangement. The strain sensor arrangement is adapted to detect tension and/or compression associated with the housing. A state of malfunction of the bearing configuration is determined based on the detected tension and/or compression. Thus, malfunction of the bearing configuration may be determined in an efficient and reliable manner so that extensive damage associated with the malfunctioning of an assembly that includes the rotary encoder may be avoided. Additionally, dangerous situations, such as a break-down associated with an assembly that includes the rotary encoder, may be efficiently avoided. Moreover, safety of an assembly that includes the rotary encoder may be improved. Accordingly, continuous monitoring of a prevailing operation state of the rotary encoder is achieved.

Therefore, a safe and reliable operation of the rotary encoder is provided. Operation of an associated assembly may be interrupted before severe damage or wear of components of the assembly and/or the rotary encoder occur. Additionally, high standards of operation, involving a small number of unexpected disturbances, may be achieved.

For example, the expected service time of the bearing configuration may be substantially achieved due to the reduction of risk for continued operation of the rotary encoder having malfunctioning components. Also, this allows for making use of data collected by the rotary encoder for statistics purposes.

It is possible to, with a high accuracy, determine that a malfunction of the bearing configuration is identified as the cause of improper operation of the rotary encoder.

The strain sensor arrangement may include at least one strain sensor configured to detect tension and/or compression and a support member for supporting the strain sensor. The support member may be attached to the housing such that detection of tension and/or compression by the strain sensor is facilitated. By thus providing such a strain sensor, reliable determination of a state of malfunction is facilitated. Accordingly, an operation monitoring process of the bearing configuration is readily and efficiently obtained. Additionally, tension and/or compression may be detected in an efficient and reliable manner so that malfunction of the bearing configuration may be readily determined.

According to example embodiments, the strain sensor arrangement further includes an electrical wire configuration and a measuring unit, the electrical wire configuration connecting the measuring unit to the strain sensor so that changes of electrical properties of the strain sensor based on the tension and/or compression are transferred to the measuring unit for facilitating the determination of a malfunction of the bearing configuration. Detection of tension and/or compression may be further facilitated so that a malfunction of the bearing configuration may be readily and efficiently determined.

According to example embodiments, the housing includes an inner ring shaped portion and an outer ring shaped portion, the outer ring shaped portion being arranged to at least partly surround the inner ring shaped portion, the inner and outer ring shaped portions being connected via a set of flexible members, and the bearing configuration has an outer ring shaped portion fixedly secured in the inner ring shaped portion. The flexible structure of the housing may be efficiently provided so as to, in connection with rotation of the shaft, facilitate transmitting forces associated with the bearing configuration to the strain sensor arrangement. The bearing configuration is arranged to be fixedly attached to the inner ring shaped portion. For example, the set of flexible members includes radially extending spokes, e.g., three spokes, distributed around the inner and outer ring shaped portions of the housing to provide the flexible structure in an efficient and stable manner. The set of flexible members, e.g., radially extending spokes, may include at least two flexible members arranged at a distance from each other between the outer side of the inner ring shaped portion and the inner side of the outer ring shaped portion. The flexible members shaped as radially extending spokes between the inner and outer ring shaped portions may be configured to have an extension in a direction parallel to the axial direction of the shaft substantially corresponding to the axial extension of the outer ring shaped portion of the housing.

According to example embodiments, the support member includes a first connection portion attached to the inner ring shaped portion and a second connection portion attached to the outer ring shaped portion. Accordingly, relative movement of the inner and outer ring shaped portions of the housing for the detection of tension and/or compression by the strain sensor arrangement may be efficiently obtained.

According to example embodiments, the support member includes a first connection portion attached to the inner ring shaped portion, a second connection portion attached to the outer ring shaped portion, and a third connection portion attached to the outer ring shaped portion, and the first connection portion is arranged between the second and third connection portions. Accordingly, relative movement of the inner and outer ring shaped portions of the housing for the detection of both tension and compression, associated with the same relative rotation of the housing, by the strain sensor arrangement may be efficiently obtained.

According to example embodiments, the strain sensor arrangement is configured to take action, when it is determined that there is a malfunction, so as to facilitate preventing extensive damage associated with malfunctioning of an assembly that includes the rotary encoder. Accordingly, an electronic control arrangement of the strain sensor arrangement is arranged to take the action. By thus taking action, dangerous situations, such as break down associated with an assembly that includes the rotary encoder, may be efficiently avoided. The strain sensor arrangement may be configured to trigger an alarm, when taking action. The electronic control arrangement of the strain sensor arrangement may be configured to shut down operation of the assembly that includes the rotary encoder, when taking action. The strain sensor arrangement may be configured to inform operators of the situation, e.g., in a visual, audible, and/or tactile manner, when taking action.

According to example embodiments, the strain sensor arrangement is adapted to determine that a malfunction of the bearing configuration is imminent or occurring upon the detected tension and/or compression being changed to a certain, e.g., a predetermined, extent. The certain extent may be set as an absolute value of a predetermined value, also referred to as a predetermined threshold value. For example, detected tension values are positive values, and detected compression values are negative values. Accordingly, a malfunction of the bearing configuration may be determined in an efficient and reliable manner. The predetermined threshold value may correspond to a certain angular displacement of the inner ring shaped portion relative to the outer ring shaped portion of the housing. The predetermined threshold value may correspond to a certain angular displacement of the first connection portion of the inner ring shaped portion relative to the second, and where applicable third, connection portion of the outer ring shaped portion of the housing.

According example embodiments, a method for determining a malfunction of a bearing configuration of a rotary encoder, in which the rotary encoder includes a shaft having the bearing configuration arranged in a housing, the housing has a flexible structure, the bearing configuration is configured to allow rotation of the shaft relative to the housing, the rotary encoder includes a rotor attached to the shaft and includes a stator, includes: detecting tension and/or compression associated with the housing in connection with rotation of the shaft, the tension and/or compression being caused by transmitted forces associated with the bearing configuration; and determining a malfunction of the bearing configuration based on the detected tension and/or compression.

The method may provide the advantages of the rotary encoder as described herein.

According to example embodiments, determining the malfunction of the bearing configuration is performed by a strain sensor arrangement.

According to example embodiments, a computer program product, e.g., a non-transitory computer-readable storage medium has stored therein, instructions which, when executed by a computer and/or a processor, cause the computer and/or processor to perform method described herein.

The rotary encoder described herein may be used in connection with paper mill systems and rolling mills. The rotary encoder may be used in connection with elevator systems, oil rig systems, and various machine tools. The rotary encoder may thus be used in a great variety of assemblies, industries, and applications.

The rotary encoder may be used in connection with various assemblies that include an engine and/or a motor for rotating a shaft. The assembly may be and/or include a vehicle, such as a mining machine, tractor, dumper, wheel-loader, forest machine, earth mover, road construction vehicle, road planner, emergency vehicle, a tracked vehicle, etc. The rotary encoder may be well suited to other applications that include a rotary shaft than vehicles, e.g. watercraft. The watercraft may be of any kind, e.g., motorboats, steamers, ferries, ships, submarines, etc.

The rotary encoder may be used in connection with various stationary assemblies and/or platforms that include a rotating shaft, such as a windmill for generating electricity.

For example, a number of rotary encoders may be provided to the assembly for detecting operational parameters of various components, units, arrangements, etc., of the assembly. The number of rotary encoders may be 2, 3, 4, or larger.

A link may include, for example, a communication link, which may be arranged as a physical connection, such as a multicore cable, an opto-electronic communication line, etc., or a non-physical connection, such as a wireless connection, e.g., a radio link, microwave link, etc.

An, e.g., electronic, control arrangement may include, for example, an arrangement having only one electronic control arrangement or a number of connected electronic control arrangements. The one electronic control arrangement or the number of connected electronic control arrangements may be arranged to perform the method described herein.

A strain sensor may include, for example, a strain gauge adapted to measure strain on an object, e.g., the housing of the rotary encoder. An example of a strain gauge includes an insulating flexible backing that supports a metallic foil pattern. As the object is deformed, the foil is deformed, causing its electrical resistance to change. This resistance change, which may be measured by a Wheatstone bridge, is related to the strain by a quantity referred to as the gauge factor. It should, however, be noted that any suitable strain sensor may be used in connection with the rotary encoder described herein.

In some implementations and according to some aspects hereof, the functions or steps noted in the blocks can occur out of the order described and/or illustrated herein. For example, two blocks illustrated in succession may be executed substantially concurrently or the blocks may be executed in the reverse order, depending upon the functionality and/or acts involved. Also, the functions or steps noted in the blocks may, in certain implementations and according to some aspects hereof, be executed continuously in a loop.

Moreover, it should be understood that example embodiments may be implemented, at least in part, by both hardware and software, and that several arrangements, units, or devices may be represented by the same item of hardware.

Further features and aspects of example embodiments of the present invention are described in more detail below with reference to the appended schematic Figures.

DETAILED DESCRIPTION

Figure 1A:
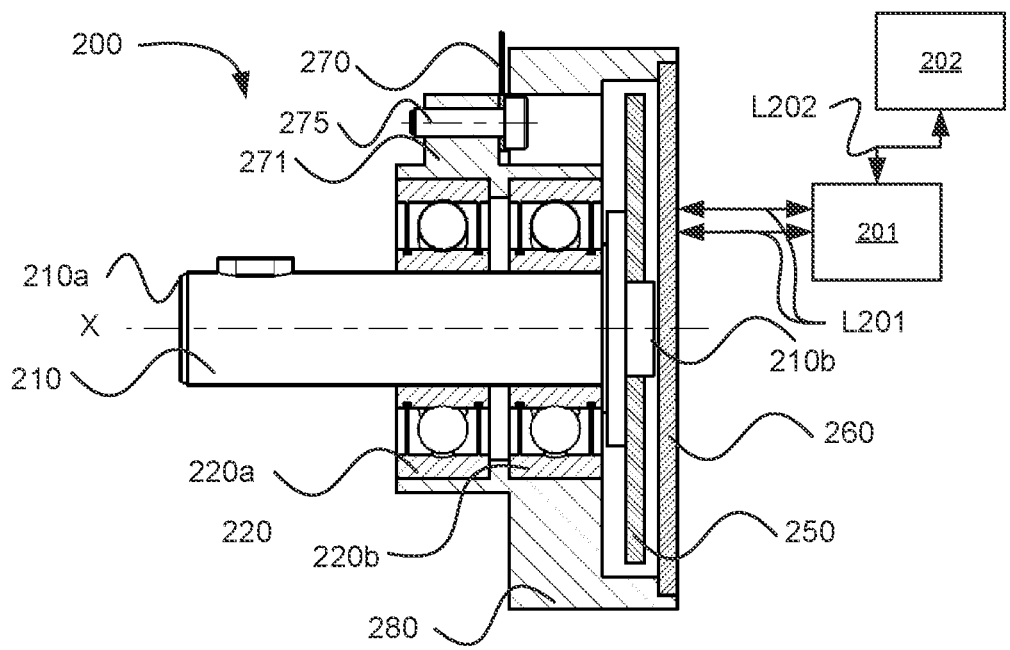
FIG. 1a is a cross-sectional view of a rotary encoder according to an example embodiment of the present invention.

The Figures schematically illustrate a rotary encoder 200 according to an example embodiment of the present invention, a method according to an example embodiment of the present invention, and a computer system according to an example embodiment of the present invention.

The rotary encoder 200 includes a shaft 210. The shaft 210 has a first end portion 210a and an opposite second end portion 210b. The shaft 210 is configured to rotate about an axis X.

The rotary encoder 200 includes a bearing housing 280, also referred to as housing 280. The housing 280 is configured to house a bearing configuration 220. The housing 280 may be formed of any suitable material, such as a metal or alloy, e.g., aluminum, stainless steel, etc. The housing 280 may be formed, for example, at least partly, of a plastic material. The housing 280 may be formed, for example, at least partly, of a ceramic.

The bearing configuration 220 includes a first bearing unit 220a. The first bearing unit 220a is configured to be fixedly connected to the shaft 210. The first bearing unit 220a may include any suitable bearings. The bearing configuration 220 includes a second bearing unit 220b. The second bearing unit 220b is configured to be fixedly connected to the shaft 210. The second bearing unit 220b may include any suitable bearings. The bearing configuration 220 is configured to allow rotation of the shaft 210 relative to the housing 280.

The first bearing unit 220a and second bearing unit 220b may be arranged next to each other around the shaft 210. The first bearing unit 220a and second bearing unit 220b may be arranged separated by a predetermined distance from each other around the shaft 210. The second bearing unit 220b is arranged closer to the second end portion 210b of the shaft 210 than the first bearing unit 220a.

The respective bearing unit 220a, 220b has an inner ring shaped portion configured to be arranged around and attached to the shaft 210, and an outer ring shaped portion configured to be connected to the housing 280. The first bearing unit 220a and the second bearing unit 220b are fixedly secured to the housing 280 at the respective outer ring shaped portions.

For example, at least two bearing units are provided at the shaft 210 for achieving a balanced and low-vibration operation of the rotary encoder 200.

The shaft 210 is configured to be attached to a rotatable device of an assembly, such as an assembly described herein. The rotary encoder 200 is arranged to determine values of a set of operational parameters of the shaft 210. The operational parameters may be characteristics of operation of the assembly. For example, the set of operational parameters may include the prevailing angular position of the shaft 210. For example, the operational parameters may including any of the parameters: prevailing angular position of the shaft 210; rotational speed of the shaft 210; etc.

The shaft 210 may be connectable to a rotatable device of the assembly by any suitable fastening device. This allows a connection in a rotatable fixed manner. A connection between the shaft 210 and a rotating device of the assembly may be achieved via a shaft coupling device.

The rotary encoder 200 is configured to detect relative rotation of a rotor 250 and a stator 260. The rotor 250 is arranged to be fixedly secured at the shaft 210. The rotor 250 is arranged to be attached to the shaft 210 by connection to the second end portion 210b of the shaft 210. The rotor 250 is configured to rotate with the shaft 210. The rotation of the rotor 250 with respect to the stator 260 may be detected using any technology capable of detecting such changes. Examples of such technologies include capacitive, optical, inductive, and/or magnetic detection, etc. The rotary encoder 200 may be configured as an incremental and/or an absolute rotary encoder. A rotor and a stator may include single components or a plurality of components.

The stator 260 may be adapted to be attached to the housing 280 in relation to the second end portion 210b of the shaft 210. The stator 260 is configured to be fixed relative to the shaft 210 so that the shaft 210 rotates relative to the stator 260.

The rotor 250 further includes a first disc having a scale for detecting relative rotation between the rotor 250 and the stator 260. The first disc is mounted at the shaft 210. When the shaft 210 rotates with respect to the stator 260, rotation measurement circuitry at the stator 260 can detect changes in the scale with respect to the rotation measurement circuitry. For example, the scale may include inductive, capacitive, and/or magnetic elements, etc., configured to cause a corresponding inductive, capacitive, and/or magnetic signals when the first disc is rotated with respect to the stator 260. The scale may be part of an optical rotary encoder, in which the rotary encoder is configured to shine a light onto a photodiode through slits in the first disc. Alternatively, a reflective version of an optical rotation measurement technology for an optical rotary encoder may be used. Alternatively, any suitable components being arranged for detecting operational parameters may be used in the rotary encoder 200. The components are chosen on the basis of the operation parameter detection method of the rotary encoder 200.

The stator 260 includes a second disc. The second disc includes measurement apparatus configured to detect relative motion of the first and second discs, e.g., by detecting the inductive, optical, capacitive, and/or magnetic signals. The second disc may be or include a printed circuit board. The stator 260 may, for example, not be disc-shaped and may be referred to as a scanner or a scanning unit. Thus, solid measure according to IEC 61800-5-3 may be provided.

The rotor 250 may be referred to as a graduation carrier or code disc. The stator 260 may be referred to as a detector. Thus, solid measure according to IEC 61800-5-3 may be provided.

The inner ring shaped portion of the respective bearing unit 220a, 220b has an inner side and an opposite outer side, the inner side being configured to face the shaft and being configured to be arranged around and fixedly attached to the shaft 210.

The outer ring shaped portion the respective bearing unit 220a, 220b has an inner side and an opposite outer side, the outer side being configured to face the inner side 282a of the inner ring shaped portion 282 of the housing 280 and is configured to be fixedly secured to the inner side 282a of the inner ring shaped portion 282. The outer side of the inner ring shaped portion of the respective bearing unit 220a, 220b is configured to face the inner side of the outer ring shaped portion of the respective bearing unit 220a, 220b, and bearing ball members of the respective bearing unit 220a, 220b are arranged and distributed between the inner ring shaped portion and outer ring shaped portion of the respective bearing unit 220a, 220b so as to facilitate rotation of the shaft 210 relative to the housing 280. The rotary encoder may be provided with any suitable bearing units, e.g., plain bearings, roller bearings, etc.

The housing 280 may include an inner ring shaped portion 282 and an outer ring shaped portion 284. The outer ring shaped portion 284 is arranged to at least partly surround the inner ring shaped portion 282.

The inner ring shaped portion 282 has an inner side 282a and an opposite outer side 282b. The outer ring shaped portion 284 has an inner side 284a and an opposite outer side 284b. At least a portion of the outer side 282b of the inner ring shaped portion 282 is configured to face at least a portion of the inner side 284a of the outer ring shaped portion 284.

The inner ring shaped portion 282 may have a first end 282c facing in the axial direction and an opposite second end 282d facing in the opposite axial direction. The outer ring shaped portion 284 may have a first end 284c facing in the axial direction and an opposite second end 284d facing in the opposite axial direction. The first end 282c of the inner ring shaped portion 282 is configured to face in the same direction as the first end 284c of the outer ring shaped portion 284. The second end 282d of the inner ring shaped portion 282 is configured to face in the same direction as the second end 284d of the outer ring shaped portion 284.

The inner ring shaped portion 282 and outer ring shaped portion 284 may be configured to be connected via a set of flexible members 285a, 285b, 285c. The inner ring shaped portion 282 and outer ring shaped portion 284 may be configured to be connected via the set of flexible members 285a, 285b, 285c between the outer side 282b of the inner ring shaped portion 282 and the inner side 284a of the outer ring shaped portion 284. The set of flexible members 285a, 285b, 285c may be configured to be arranged between the outer side 282b of the inner ring shaped portion 282 and the inner side 284a of the outer ring shaped portion 284 so as to provide the connection of the inner ring shaped portion 282 and outer ring shaped portion 284.

The housing 280 may include the set of flexible members 285a, 285b, 285c configured to connect the inner ring shaped portion 282 and outer ring shaped portion 284. The inner ring shaped portion 282, the outer ring shaped portion 284, and the set of flexible members 285a, 285b, 285c may be configured to provide an integrated part of the housing 280.

Thus, the set of flexible members 285a, 285b, 285c may be configured to provide an integrated transition between the inner ring shaped portion 282 and the outer ring shaped portion 284. The set of flexible members 285a, 285b, 285c may include separate parts configured to be attached between the inner ring shaped portion 282 and outer ring shaped portion 284 of the housing so as to provide the connection of the inner ring shaped portion 282 and outer ring shaped portion 284. For example, the space between outer ring surface 284a and inner ring surface 282b may be filled with a flexible material.

The set of flexible members 285a, 285b, 285c may be provided by spokes 285a, 285b, 285c distributed between the inner ring shaped portion 282 and outer ring shaped portion 284 so as to provide the connection of the inner ring shaped portion 282 and outer ring shaped portion 284. The spokes 285a, 285b, 285c distributed between the inner ring shaped portion 282 and outer ring shaped portion 284 may be configured to extend in a radial direction between the outer side 282b of the inner ring shaped portion 282 and the inner side 284a of the outer ring shaped portion 284. As illustrated, for example, in FIGS. 1b, 3a, and 4b, the set of flexible members 285a, 285b, 285c are provided by three spokes 285a, 285b, 285c evenly distributed between the inner ring shaped portion 282 and outer ring shaped portion 284. The set of flexible members may be provided by any suitable number of such spokes, e.g., two spokes, four spokes, five spokes, or more.

The first end 282c of the inner ring shaped portion 282 and the first end 284c of the outer ring shaped portion 284 may be configured to face away from the stator 260. The second end 282d of the inner ring shaped portion 282 and the second end 284d of the outer ring shaped portion 284 may be configured to face toward the stator 260.

The rotary encoder includes a strain sensor arrangement 270, 274a, 274b, 276a, 276b, 205, 600 configured to determine malfunction of the bearing configuration 220. The strain sensor arrangement is attached to the housing 280.

The housing 280 has a flexible structure so as to, in connection with rotation of the shaft 210, facilitate transmitting forces associated with the bearing configuration 220 to the strain sensor arrangement. The flexible structure of the housing 280 may be configured to be provided by the arrangement of the housing including the inner ring shaped portion 282, the outer ring shaped portion 284 arranged to at least partly surround the inner ring shaped portion 282, and the set of flexible members 285a, 285b, 285c connecting the inner and outer ring shaped portions 282, 284.

The strain sensor arrangement is arranged to detect tension and/or compression associated with the housing 280. A malfunction of the bearing configuration 220 is arranged to be determined based on the detected tension and/or compression.

The strain sensor arrangement includes at least one strain sensor 274a, 274b configured to detect tension and/or compression and a support member 270 for supporting the strain sensor 274a, 274b.

The support member 270 may be configured to be attached to the housing 280 such that detection of tension and/or compression by the strain sensor(s) is facilitated.

The support member 270 may include a first connection portion 271, 275 attached to the inner ring shaped portion 282 of the housing 280.

The first connection portion 271, 275 of the support member 270 may include a protrusion member 271 configured to protrude outwardly from the outer side 282b of the inner ring shaped portion 282 so as to facilitate connection and support of the strain sensor(s) 274a, 274b.

The protrusion member 271 includes a recess 271a arranged in the protrusion member 271. The recess 271a is arranged to extend in the axial direction of the inner ring shaped portion 282. For example, the recess 271a is shaped as a through hole arranged to extend in the axial direction through the protrusion member 271.

The first connection portion 271, 275 of the support member 270 includes an attachment member 275 for attaching the strain sensor(s) 274a, 274b to the protrusion member 271. The attachment member 275 may be configured to be introduced into the recess 271a so as to provide attachment of the strain sensor(s) 274a, 274b to the protrusion member 271. The recess 271a in the protrusion member 271 is thus configured to receive the attachment member 275. The attachment member 275 may be any suitable attachment member 275, such as a screw joint, etc.

For example, the support member 270 includes an elongated support element 278. The elongated support element 278 may be arranged to support the strain sensor(s) 274a, 274b. The strain sensor(s) 274a, 274b may be configured to be connected to the elongated support element 278.

The elongated support element 278 may have a first through hole 278c configured to be centrally arranged in the elongated support element 278. For example, the elongated support element 278 has a second through hole 278a arranged in a first end of the elongated support element 278. The elongated support element 278 may have a third through hole 278b arranged in a second end of the elongated support element 278, opposite to the first end. The first through hole 278c may be arranged between the second through hole 278a and the third through hole 278b.

The strain sensor arrangement may include a first strain sensor 274a configured to be connected to the elongated support element 278 between the centrally arranged first through hole 278c and the second through hole 278a. The strain sensor arrangement may include a second strain sensor 274b configured to be connected to the elongated support element 278 between the centrally arranged first through hole 278c and the third through hole 278b.

The strain sensor arrangement may include a first electrical wire configuration 276a connected to the first strain sensor 274a so that changes of electrical properties of the first strain sensor 274a based on the tension and/or compression is transferred to the first electrical wire configuration 276a for facilitating the determination of a malfunction of the bearing configuration 220. The strain sensor arrangement may include a second electrical wire configuration 276b connected to the second strain sensor 274b so that changes of electrical properties of the second strain sensor 274b based on the tension and/or compression is transferred to the second electrical wire configuration 276b for facilitating the determination of a malfunction of the bearing configuration 220. The first electrical wire configuration 276a and the second electrical wire configuration 276b are connected to a measuring unit 205.

The support member 270 may include a second connection portion 279a attached to the outer ring shaped portion 284 of The housing 280. The support member 270 may include a third connection portion 279b attached to the outer ring shaped portion 284 of the housing 280. For example, the first connection portion 271, 275 is arranged between the second and third connection portions 279a, 279b.

The second connection portion 279a and third connection portion 279b may be configured to attach the elongated support element 278 to the outer ring shaped portion 284. The second connection portion 279a and third connection portion 279b may be configured to attach the elongated support element 278 to the first end 284c of the outer ring shaped portion 284.

The outer ring shaped portion 284 includes, for example, a first recess 284c-1 arranged in the first end 284c and a second recess 284c-2 arranged in the first end 284c at a predetermined distance from the first recess 284c-1 for facilitating attachment of the elongated support element 278. The first recess 284c-1 and second recess 284c-2 may extend in the axial direction of the outer ring shaped portion 284 between the inner side 284a and outer side 284b a certain distance into the outer ring shaped portion 284.

The first recess 284c-1 may be configured to receive the second connection portion 279a via the second through hole 278a of the elongated support element 278 so as to provide attachment of the elongated support element 278 and hence the strain sensor(s) 274a, 274b to the outer ring shaped portion 284 of the housing 280.

The second recess 284c-2 may be configured to receive the third connection portion 279b via the third through hole 278b of the elongated support element 278 so as to provide attachment of the elongated support element 278 and hence the strain sensor(s) 274a, 274b to the outer ring shaped portion 284 of the housing 280.

The recess 271a of the protrusion member 271 may be configured to receive the attachment member 275 via the first through hole 278c of the elongated support element 278 so as to provide attachment of the elongated support element 278 and hence the strain sensor(s) 274a, 274b to the inner ring shaped portion 282 of the housing 280.

The first recess 284c-1 and the second recess 284c-2 of the outer ring shaped portion 284 are arranged at substantially the same level as the recess 271a of the protrusion member 271 so as to facilitate attachment of the elongated support element 278 via the through holes 278a, 278b, 278c. The recess 271a of the protrusion member 271 is, according to this configuration, arranged between the first recess 284c-1 and the second recess 284c-2 of the outer ring shaped portion 284.

Figure 2:
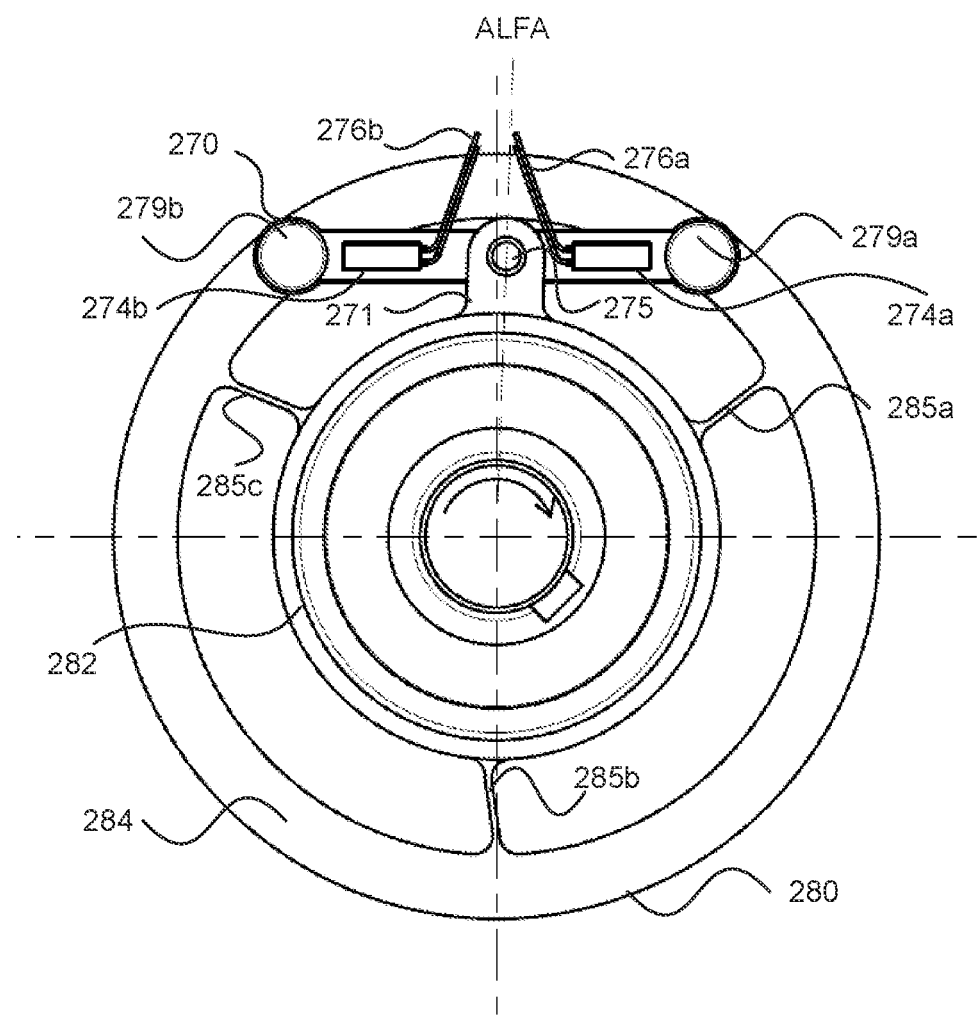
FIG. 2 is a front view of the rotary encoder.

The strain sensor arrangement may be adapted to determine that a malfunction of the bearing configuration 220 is imminent or occurring upon a change of the detected tension and/or compression to a certain, e.g., a predetermined, extent. The strain sensor arrangement may be adapted to determine that a malfunction of the bearing configuration 220 is imminent or occurring upon a change of the detected tension and/or compression to a certain, e.g., a predetermined, extent by detecting a certain rotation of the inner ring shaped portion 282 relative to the outer ring shaped portion 284. This is illustrated in FIG. 2, which is a schematic front view of the rotary encoder 200, in which the protrusion member 271, due to relative rotation between the inner ring shaped portion 282 and outer ring shaped portion 284 has moved from a central position relative to the elongated support element 278 toward one of the ends of the elongated support element 278. Thus, a relative rotation between the inner ring shaped portion 282 and outer ring shaped portion 284 has occurred so that the protrusion member 271 has moved a certain angle relative to its original position.

A control arrangement 201 is adapted to communicate with the rotary encoder 200 via a link L201. For example, the control arrangement 201 is adapted to communicate with the rotation measurement circuitry at the stator 260 via the link L201. Thus, the stator 260 is arranged to send signals, including information about operational parameters, to the control arrangement 201 via the link L201.

The control arrangement 201 is adapted to determine values of the operational parameters and to present determined values of the operational parameters via any suitable presentation device, e.g., presentation device 202, monitor, display, indicator, output device, etc., to an operator of the assembly and/or the rotary encoder 200. Alternatively or additionally, the control arrangement 201 is adapted to generate control signals for a motor drive based on the operational parameters.

For example, the rotation measurement circuitry at the stator 260 may be adapted to perform the same functions as the control arrangement 201. For example, detection of operational parameters may be performed by any of the rotation measurement circuitry at the stator 260 and/or the control arrangement 201.

The rotary encoder 200 may further be configured for electromagnetic compatibility scenarios. The housing 280 of the rotary encoder 200 may be arranged to fix and protect fragile EMC components from vibrations. For example, the rotary encoder 200 further includes electrostatic discharge, ESD, shielding adapted to shield the rotary encoder 200 from electrostatic charge and/or discharge. Additionally, for example, the rotary encoder 200 further includes electromagnetic shielding adapted to prevent electromagnetic radiation to and/or from the rotary encoder 200 exceeding a predetermined threshold. The rotary encoder 200 may be configured to function without degradation in the presence of a predetermined electromagnetic disturbance. In other words, for example, the rotary encoder 200 is configured to be electromagnetically immune to a predetermined radio frequency interference.

The rotary encoder 200 may include a set of sealing components arranged at the rotary encoder 200. The set of sealing components is arranged to seal the rotary encoder 200 from the environment.

The rotary encoder 200 may include a set of spacers. The set of spacers is configured to fix a relative position between two or more components of the rotary encoder 200.

The control arrangement 201 is adapted for communication with the presentation device 202 via a link L202. The presentation device 202 may include a display for visual presentation to an operator. The presentation device may comprise visual/audio/tactile presentation devices for presenting information about operational status of the rotary encoder 200. For example, the presentation device 202 is adapted to present information to an operator when malfunction of the bearing configuration 220 has been determined as described herein.

The control arrangement 201 may be adapted to generate an alarm signal in response to a malfunction of the bearing configuration 220. Thus, the control arrangement 201 is arranged to provide the alarm signal to any device, such as the presentation device 202. The alarm signal is provided so as to indicate malfunctioning of the bearing configuration 220 to an operator.

The control arrangement 201 may be adapted to automatically interrupt operation of the assembly connected to rotary encoder 200 in response to a malfunction of the bearing configuration 220. For example, the control arrangement 201 is adapted to automatically interrupt operation of the assembly connected to rotary encoder 200 in response to a detection of a malfunction of the bearing configuration 220 as described herein.

The strain sensor arrangement may be adapted to generate and transmit a discrete signal for automatically disconnecting an emergency stop circuit in response to the normal or operational operation not occurring (e.g., malfunctioning of at least one of the bearing units 220a, 220b has been detected). Thus, operation of the assembly may be automatically shut down in response to a malfunction of at least one of the bearing units 220a, 220b.

Figure 1B:
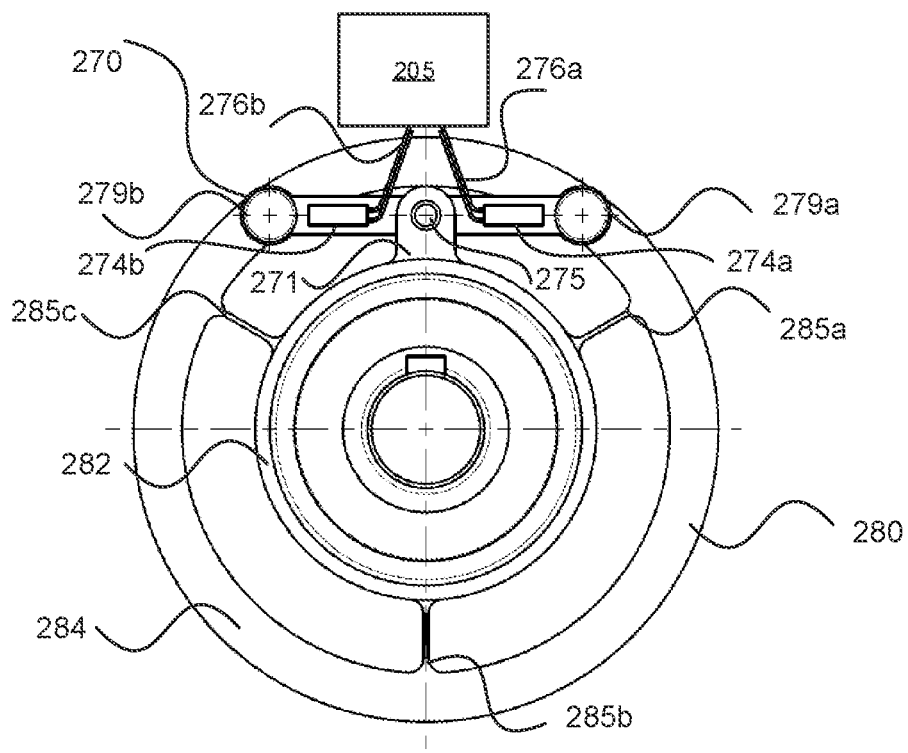
FIG. 1b is a front view of the rotary encoder.

Referring, for example, to FIG. 1b, which is a schematic front view of the rotary encoder 200, the measuring unit 205 is connected to the first strain sensor 274a and the second strain sensor 274b via the first electrical wire configuration 279a and the second electrical wire configuration 279b, respectively. The measuring unit 205 is adapted to detect a prevailing tension and/or compression of the housing 280. The measuring unit 205 may include one or more electronic control arrangement(s) or suitable circuitry for transmitting information relating to the detected tension and/or compression to the control arrangement 201 via a link. This link may be a separate link, or it may be part of the link L201 illustrated in FIG. 1a as a parallel link, a link which may include one or more additional signal lines. Alternatively, the link L201 may be a serial data interface, and the information may be transmitted by data frames. The data may also contain values of operational parameters. The circuit of the measuring unit 205 may be located either on a separate printed circuit board (PCB) or on the PCB of the stator 260, by which any of the mentioned PCBs is at least indirectly attached to the housing 280. The measuring unit 205 may include a power source for providing electricity for strain measurements. The power source may be an electric battery.

FIG. 1b illustrates operation of the rotary encoder in a normal, functioning, state, which is also referred to as a first operational state. For example, the bearing configuration 220, including the first bearing unit 220a and the second bearing unit 220b, operates without any malfunctioning. In the first operational state, the inner ring shaped portion 282 is aligned with the outer ring shaped portion 284, i.e., no relative angular displacement between the inner portion 282 and the outer portion 284 is occurring. There is thus no or little (e.g., less than a certain extent, or less than a predetermined value) detected tension and/or compression. During operation of the rotary encoder 200 in the first operational state, it is determined that there is no relative displacement in a rotational direction between the inner portion 282 and the outer portion 284. In the first operational state, there is no detected malfunction of the bearing configuration 220.

FIG. 2 is a schematic front-view of the rotary encoder 200, in which the operation of the rotary encoder is in a non-normal, malfunctioning, state. This state is referred to as a second operational state. For example, the bearing configuration 220, including the first bearing unit 220a and the second bearing unit 220b, is not operating correctly. In the second state, the inner ring shaped portion 282 is moved in a rotational direction relative the outer ring shaped portion 284. This is caused by at least one malfunctioning bearing unit 220a, 220b and provided by the flexible structure of the housing 280 by the flexible members 285a, 285b and 285c. It is noted that the inner ring shaped portion 282 is rotated clockwise to a certain extent, indicated by the displacement angle ALFA. During operation of the rotary encoder 200 in the second operational state, it is determined that there is a detected tension/compression occurring, which tension/compression exceeds a predetermined value. This predetermined value be empirically determined. Adequate threshold values relating to the detected tension and compression are compared with the respective prevailing detected tension and compression values. In the second operational state, it is determined that malfunction of the bearing configuration 220 is occurring. The measuring unit 205 and/or the control arrangement 201 are configured to determine whether there is a malfunction of the bearing configuration based on said comparison(s).

By determining both tension values and compression values at the same time, more accurate measurements may be performed. Accordingly, redundancy is achieved in a case where one of the sensor units is not working properly. Data relating to the measured tension and compression values may be used for purposes of condition monitoring of the bearing configuration 220.

Figure 3A:
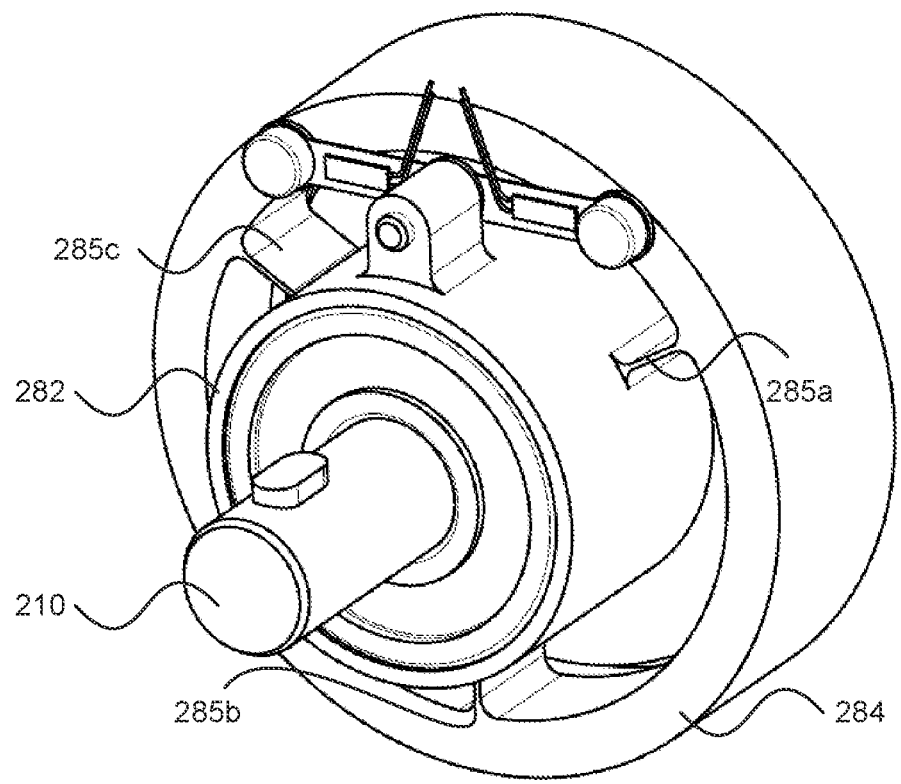
FIG. 3a is a perspective view of the rotary encoder.
Figure 3B:
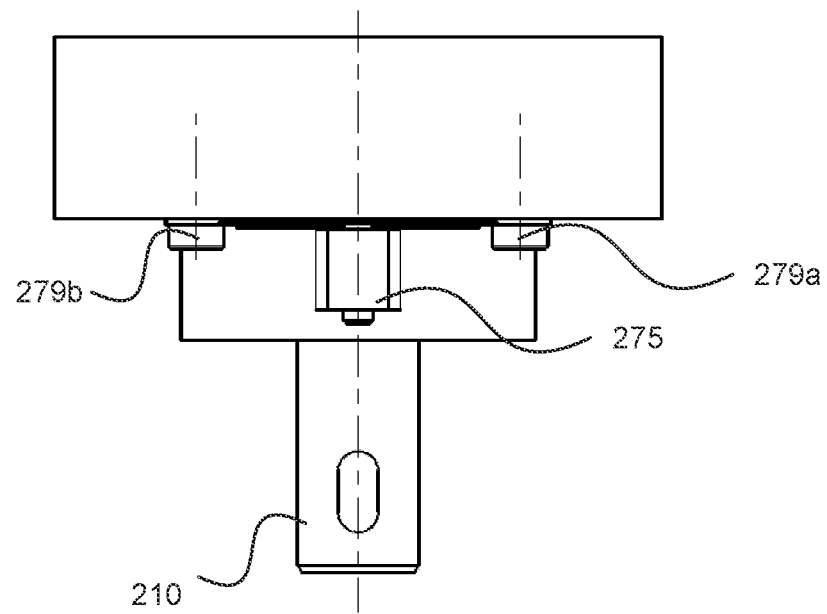
FIG. 3b is a side view of the rotary encoder.
Figure 4A:
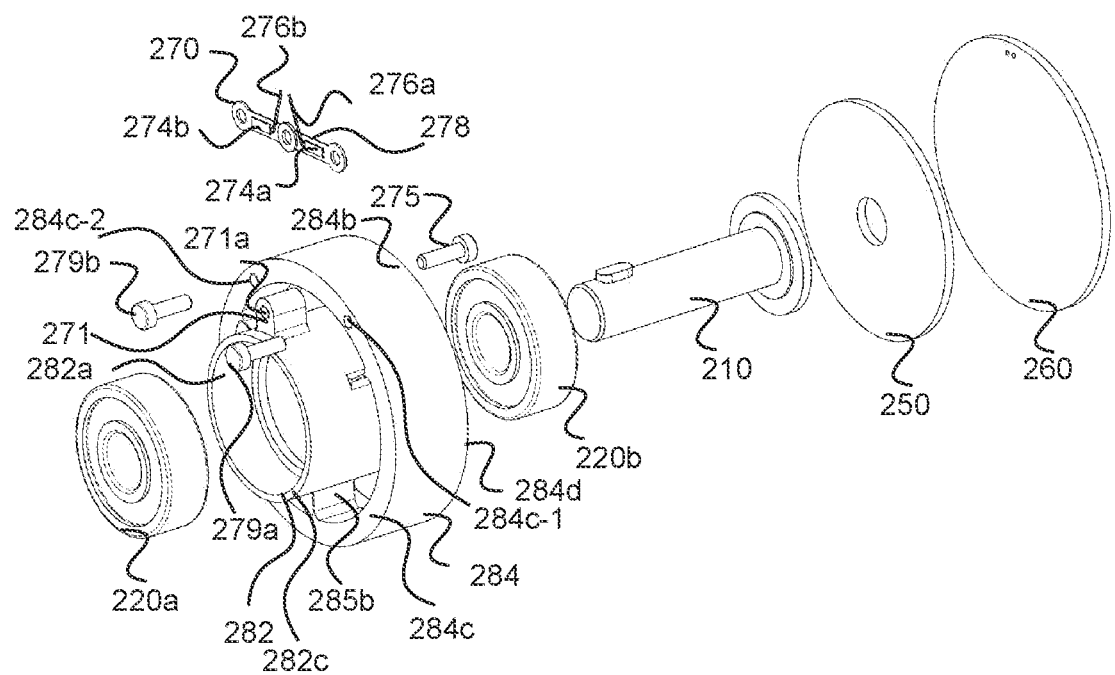
FIG. 4a is an exploded view of the rotary encoder.
Figure 4B:
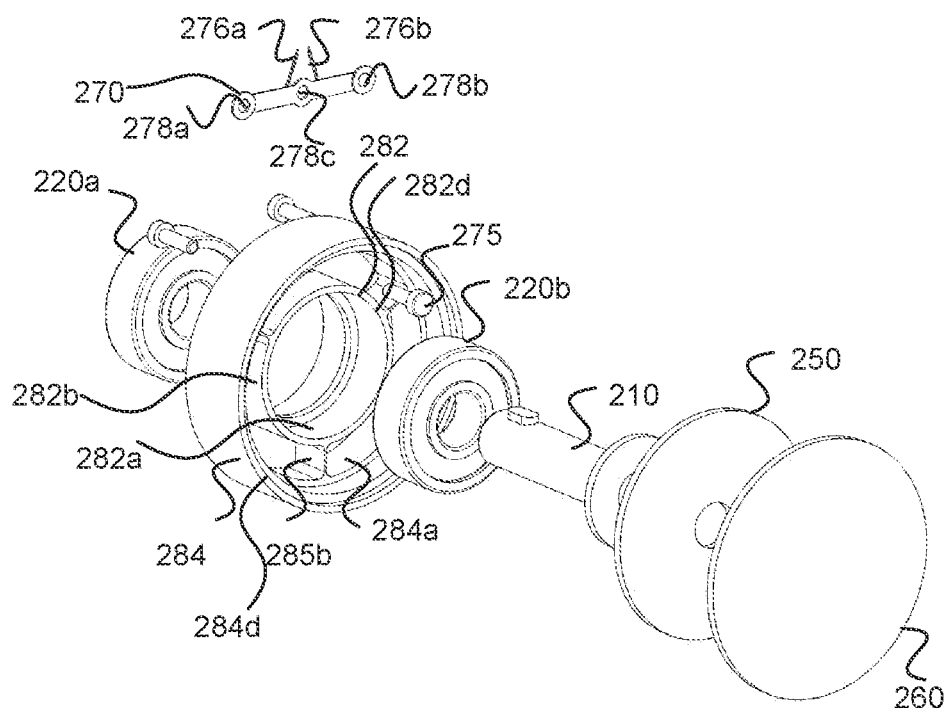
FIG. 4b is another exploded view of the rotary encoder.

FIG. 3a is a schematic perspective view of the rotary encoder 200, FIG. 3b is a schematic side view of the rotary encoder 200, and FIGS. 4a and 4b are schematic exploded views of the rotary encoder 200.

Figure 5:
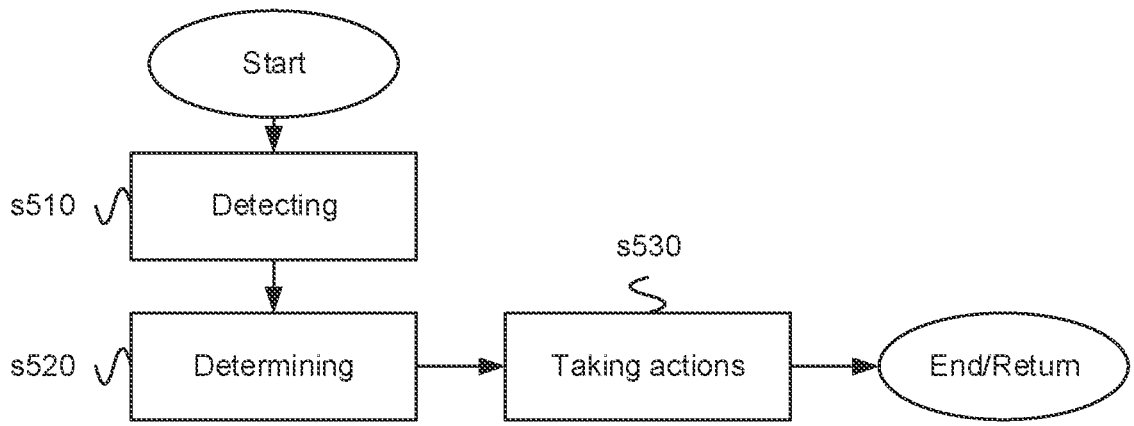
FIG. 5 is a flowchart illustrating a method according to an example embodiment of the present invention.

FIG. 5 is a flowchart of a method according to an example embodiment of the present invention for determining a malfunction of the bearing configuration 220 of the rotary encoder 200. The rotary encoder 200 includes the shaft 210 having the bearing configuration 220 arranged in the housing 280, which has a flexible structure. The bearing configuration 220 is configured to allow rotation of the shaft 210 relative to the housing 280. The rotary encoder 200 includes the rotor 250, which is attached to the shaft 210. The rotary encoder 200 also includes the stator 260.

The method includes detecting, in s510, tension and/or compression associated with the housing 280 in connection with rotation of the shaft 210, in which the tension and/or compression is caused by transmitted forces associated with the bearing configuration 220. The detection of the tension and/or compression may be performed by the strain sensor arrangement, which includes, e.g., the first and second strain sensors 274a and 274b, the measuring unit 205, and the control arrangement 201. The detection may be performed continuously. The detection may be performed intermittently. Data relating to the detected tension and/or compression may be transmitted to an external monitoring system. Data relating to the detected tension and/or compression may be transmitted to a SCADA-system. The transmitted data may be used for logging purposes, evaluation purposes, and/or analysis purposes. The data may be transmitted continuously The method includes determining, in s520, a malfunction of the bearing configuration 220 based on the detected tension and/or compression. The determining may be performed by the strain sensor arrangement described herein. The measuring unit 205 and/or the control arrangement 201 may be configured to determine that there is a state of malfunction of the bearing configuration in the event that relative rotational motion between the inner ring shaped portion 282 and the outer ring shaped portion 284 is present (to at least a certain extent).

After the detecting s510 and the determining s520, taking action(s), in s530, may be performed. For example, taking actions may include generating an alarm signal in response to a malfunction of the bearing configuration 220 having been determined. Thus, an operator at an early stage may be informed that the bearing configuration 220 is malfunctioning. Accordingly, the operator may manually interrupt operation of the rotary encoder 200 and/or operation of an assembly connected to the shaft 210.

Taking actions may include automatically interrupting operation of the assembly connected to the rotary encoder 200 in response to a malfunction of the bearing configuration 220 having been determined.

Taking actions may include alerting, presenting, or proposing to an operator to perform condition based maintenance of the rotary encoder 200, e.g., condition based maintenance of the bearing configuration.

Taking actions may include, by a SCADA-system, controlling operation of the assembly connected to the rotary encoder 200 in response to a malfunction of the bearing configuration 220 having been determined.

Taking actions may include automatically interrupting operation of the assembly connected to the rotary encoder 200. This may be performed by the control arrangement 201 or the measuring unit 205. For example, interrupting operation of the assembly connected to the rotary encoder 200 may be performed by switching the power off, thus shutting down the assembly at least partly. This may be performed by the control arrangement 201 or the measuring unit 205.

After taking action(s) in s530, the method ends and/or is returned.

Figure 6:
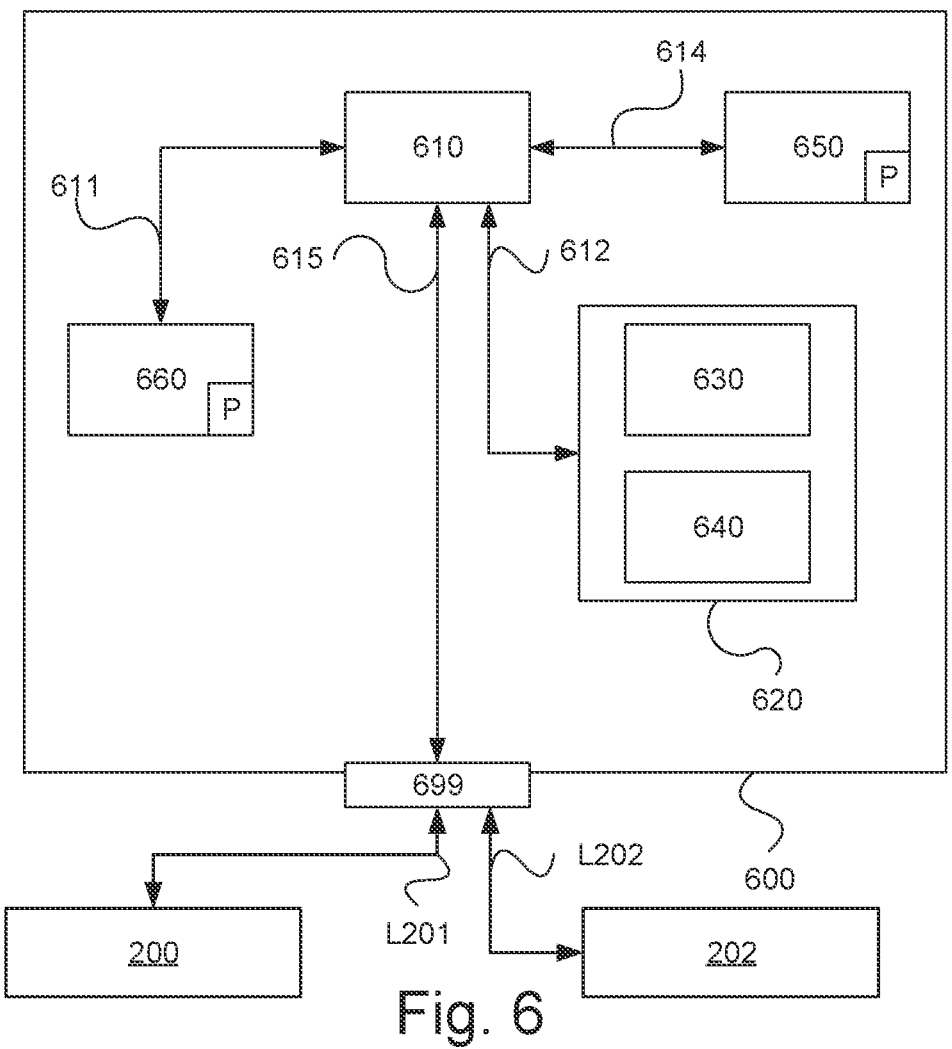
FIG. 6 illustrates a computer system according to an example embodiment of the present invention.

FIG. 6 schematically illustrates a device 600. The control arrangement 201 described with reference to, e.g., FIG. 1a, may include the device 600. The measuring unit 205 may include the device 600. The rotation measurement circuitry of the stator 260 may include the device 600. The device 600 includes a non-volatile memory 620, a data processing unit 610, and a read/write memory 650. The non-volatile memory 620 includes a first memory portion 630 in which a computer program, e.g., an operating system, is stored for controlling the function of the device 600. The device 600 further includes a bus controller, a serial communication port, I/O device(s), an A/D converter, a time and date input, a transfer unit, an event counter, and an interruption controller. The non-volatile memory 620 has also a second memory portion 640.

A computer program P may be provided and may include routines for detecting tension and/or compression associated with the housing 280 in connection with rotation of the shaft 210, in which the tension and/or compression is caused by transmitted forces associated with the bearing configuration 220.

The computer program P may also include routines for determining malfunction of the bearing configuration based on the detected tension and/or compression.

The computer program P may include routines for generating an alarm signal when malfunction of the bearing configuration 220 has been determined.

The computer program P may include routines for automatically interrupting operation of the assembly connected to the rotary encoder 200 in response to a malfunction of the bearing configuration 220 having been determined.

The computer program P may include routines for performing any or all portions of the method described herein.

The program P may be stored in an executable form or in compressed form in a memory 660 and/or in a read/write memory 650.

The data processing unit 610 performs certain functions, in that the data processing unit 610 performs certain part(s) of the program stored in the memory 660 or certain part(s) of the program stored in the read/write memory 650.

The data processing device 610 is adapted to communicate with a data port 699 via a data bus 615. The non-volatile memory 620 is adapted to communicate with the data processing unit 610 via a data bus 612. The separate memory 660 is adapted to communicate with the data processing unit via a data bus 611. The read/write memory 650 is adapted to communicate with the data processing unit 610 via a data bus 614. The links L201 and L202, for example, may be connected to the data port 699 (see, e.g., FIGS. 1*a* and 6).

Data received on the data port 699 are stored in the second memory element 640. When input data received have been stored, the data processing unit 610 will be prepared to conduct code execution as described above.

Parts of the methods described herein may be performed by the device 600 by the data processing unit 610, which executes the program stored in the memory 660 or the read/write memory 650. When the device 600 executes the program, the method, or parts thereof, are executed.

The method, or parts thereof, described herein may be performed by, e.g., the device 600. Any suitable processing circuitry may be used for performing the method, or parts thereof. The processing circuitry may be arranged in the rotary encoder 200 or externally of the rotary encoder 200, such as at the assembly.

The computer program product includes a non-volatile, computer readable storage medium, such as, for example, a memory unit, a universal serial bus (USB) memory, a plug-in card, an embedded drive, a read only memory (ROM), etc. The computer readable storage medium has stored therein, or thereon, a computer program including program instructions. The computer program is loadable into the processing circuitry arranged in any of the control arrangement 201 or the rotation measurement circuitry of the stator 260. When loaded into the processing circuitry, the computer program may be stored in a memory associated with or arranged in the processing circuitry and executed by a processor. The computer program may, when loaded into and executed by the processing circuitry, cause execution of the method, or portion(s) thereof, illustrated in FIG. 5 or otherwise described herein.

For example, a computer program product includes instructions which, when the program is executed by a computer, e.g., the control arrangement 201, cause the computer to perform the method, or parts thereof, described herein.

A non-volatile, computer-readable storage medium may include instructions, which, when executed by a computer, e.g., the control arrangement 201, cause the computer to perform the method, or portions thereof, described herein.

What is claimed is:

1. A rotary encoder, comprising:
   a housing including a flexible structure;
   a shaft including a bearing system arranged in the housing, the shaft being rotatable relative to the housing via the bearing system;
   a rotor attached to the shaft;
   a stator; and
   a strain sensor system attached to the housing;
   wherein the flexible structure is adapted to, in connection with rotation of the shaft, facilitate transmission of forces associated with the bearing system to the strain sensor system, the strain sensor system adapted to detect tension and/or compression associated with the housing and to determine a malfunction of the bearing system based on the detected tension and/or compression.

2. The rotary encoder according to claim 1, wherein the strain sensor system includes at least one strain sensor adapted to detect tension and/or compression and a support member adapted to support the strain sensor, the support member being attached to the housing to facilitate detection of tension and/or compression by the strain sensor.

3. The rotary encoder according to claim 2, wherein the strain sensor system includes an electrical wire system and a measuring unit, the electrical wire system connecting the measuring unit to the strain sensor to transfer changes of electrical properties of the strain sensor based on the tension and/or compression to the measuring unit to facilitate determination of the malfunction of the bearing system.

4. The rotary encoder according claim 1, wherein the housing includes an inner ring shaped portion and an outer ring shaped portion, the outer ring shaped portion at least partly surrounding the inner ring shaped portion, the inner and outer ring shaped portions being connected via a set of flexible members, the bearing system including an outer ring shaped portion fixedly secured in the inner ring shaped portion of the housing.

5. The rotary encoder according to claim 4, wherein a support member of the strain sensor system includes a first connection portion attached to the inner ring shaped portion of the housing and a second connection portion attached to the outer ring shaped portion of the housing.

6. The rotary encoder according to claim 4, wherein a support member of the strain sensor system includes a first connection portion attached to the inner ring shaped portion of the housing, a second connection portion attached to the outer ring shaped portion of the housing, and a third connection portion attached to the outer ring shaped portion of the housing, the first connection portion being arranged between the second connection portion and the third connection portion.

7. The rotary encoder according to claim 1, wherein the strain sensor system is adapted to determine that a malfunction of the bearing configuration is occurring in response to the detected tension and/or compression changing by a predetermined amount.

8. The rotary encoder according to claim 1, wherein the bearing system includes at least one roller bearing.

9. The rotary encoder according to claim 1, wherein the strain sensor system includes at least one strain gauge.

10. The rotary encoder according to claim 9, wherein the strain gauge is adapted to detect the tension and/or compression based on a change in electrical resistance caused by a deformation of a metallic foil.

11. The rotary encoder according to claim 10, wherein the strain sensor system includes a Wheatstone bridge adapted to detect the change in electrical resistance.

12. The rotary encoder according to claim 1, wherein the rotary encoder is adapted to detect rotation of the rotor relative to the stator capacitively, optically, inductively, and/or magnetically.

13. The rotary encoder according to claim 1, wherein the rotary encoder is arranged as an incremental rotary encoder.

14. The rotary encoder according to claim 1, wherein the rotary encoder is arranged as an absolute rotary encoder.

15. The rotary encoder according to claim 1, wherein the rotary encoder is adapted to perform a method for determining the malfunction of the bearing system of the rotary encoder including:

detecting tension and/or compression associated with the housing related to rotation of the shaft, the tension and/or compression being caused by transmitted forces associated with the bearing system; and determining the malfunction of the bearing system based on the detected tension and/or compression.

16. A method for determining a malfunction of a bearing system of a rotary encoder, the rotary encoder including a housing including a flexible structure, a shaft including the bearing system arranged in the housing, the shaft being rotatable relative to the housing via the bearing system, a rotor attached to the shaft, and a stator, comprising:

detecting tension and/or compression associated with the housing related to rotation of the shaft, the tension and/or compression being caused by transmitted forces associated with the bearing system; and determining the malfunction of the bearing system based on the detected tension and/or compression.

17. The method according to claim 16, wherein the rotary encoder includes a strain sensor system attached to the housing, the flexible structure being adapted to, in connection with rotation of the shaft, facilitate transmission of forces associated with the bearing system to the strain sensor system, the strain sensor system adapted to detect the tension and/or compression associated with the housing and to determine the malfunction of the bearing system based on the detected tension and/or compression.

18. The method according to claim 16, wherein the determining of the malfunction of the bearing system is performed by a strain sensor system.

19. A non-transitory computer-readable storage medium having stored therein instructions which, when executed by a processor, cause the processor to perform a method for determining a malfunction of a bearing system of a rotary encoder, the rotary encoder including a housing including a flexible structure, a shaft including the bearing system arranged in the housing, the shaft being rotatable relative to the housing via the bearing system, a rotor attached to the shaft, and a stator, the method including:

detecting tension and/or compression associated with the housing related to rotation of the shaft, the tension and/or compression being caused by transmitted forces associated with the bearing system; and determining the malfunction of the bearing system based on the detected tension and/or compression.

20. The non-transitory computer-readable storage medium according to claim 19, wherein the rotary encoder includes a strain sensor system attached to the housing, the flexible structure being adapted to, in connection with rotation of the shaft, facilitate transmission of forces associated with the bearing system to the strain sensor system, the strain sensor system adapted to detect the tension and/or compression associated with the housing and to determine the malfunction of the bearing system based on the detected tension and/or compression.

* * * * *